Aug. 10, 1965  T. WEISZ  3,199,816

PIPE-MOUNTING DEVICE

Filed Feb. 20, 1963

INVENTOR
TIBOR WEISZ

BY Karl G. Ross

AGENT

United States Patent Office 3,199,816
Patented Aug. 10, 1965

3,199,816
PIPE-MOUNTING DEVICE
Tibor Weisz, Rte. des Charbonniers, Saint-Florentin, Yonne, France
Filed Feb. 20, 1963, Ser. No. 259,909
Claims priority, application France, Feb. 22, 1962, 888,889
7 Claims. (Cl. 248—71)

This invention relates to a device for securing pipes, tubes or similar articles to a wall, panel or other structure.

It is an object of this invention to provide a device of this type capable of producing an attachment offering maximum sturdiness while offering the exact alignments frequently required in the installation of rectilinear pipe assemblies.

It is a further object of this invention to provide a device of the type described which will permit the aforementioned operations to be carried out in a manner simpler and quicker than hitherto possible.

Another object of this invention is to provide such a device in a simplified construction and with a reduced number of component parts.

The device according to this invention is characterized by the fact that it can combine the pipe-clamping means and the means of securing the former to a wall into a single, easily handled element. In line with the object of simplifying installation, the means of securing the device to a wall, e.g. a screw or nail, also can serve to tighten the pipe clamp, thus speeding installation and eliminating the need for separate clamping and fastening steps.

The invention is illustrated, by way of example, by embodiments described hereinafter and shown in the attached drawing, in which.

Figure 1:
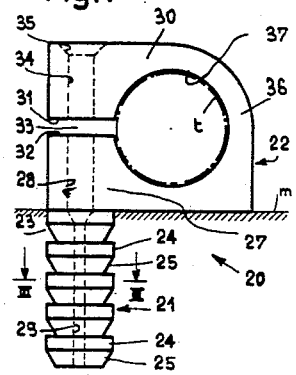
FIGURE 1 is an elevational view of a first embodiment of my invention.
Figure 4:
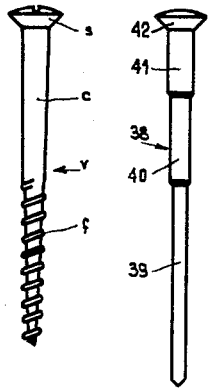
FIGURE 4 is an elevational view of a clamping and fastening screw for use with the device.
Figure 5:
FIGURE 5 is an elevational view of a nail which may be substituted for the screw of FIG. 4.

Reference is first that to FIGURES 1 to 5. The embodiment shown therein comprises a single element 20, consisting of a retaining plug 21 and a split collar 22 which may be produced integrally from a synthetic resin by way of casting. The plug 21, which may of course be of many different shapes, is here shown to consist of a longitudinally arrayed series of cylindroconic bosses 23, the cylindrical part 24 of each boss being integral with a truncated-cone shaped part 25 which is followed by the cylindrical part 24 of the following boss, etc. Generally cylindrical, the plug 21 is able to expand radially by means of a longitudinal slot 26 provided in the wall of the plug. The plug 21 is integral with the split collar 22 which is provided in part 27 of its two-part compression flange, from which plug 21 projects, with a bore 28 axially aligned with a similar bore 29 extending the length of the plug 21; the diameter of the conical bore 29 is smaller than that of conical bore 28. A second compression-flange 30, cooperating with flange 27, is provided with a face 31 juxtaposed with a similar face 32 provided on part 27; a gap 33 separates the two faces. Part 30 is also provided with a bore 34 in axial alignment with bore 28, both of these being of identical diameter. At its outer end bore 34 terminates with a frustoconical countersink 35. Parts 27 and 30 are connected by an arcuate bridge 36.

A hole having been drilled beforehand in the wall or panel m in the usual manner, the plug 21 is introduced into this hole. A pipe, tube or similar member, generally designated t is placed in the opening 37 of the collar, and a screw v (FIG. 4) or a nail 38 (FIG. 5) is driven successively through the axially aligned bores 34, 28 and 29, thus simultaneously expanding plug 21 and tightening the collar 22 around the pipe t.

Figure 6:
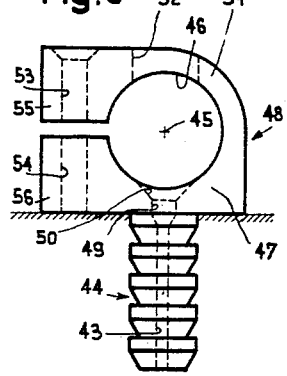
FIGURE 6 is a view similar to FIG. 1, but of another embodiment of the invention.
Figure 7:
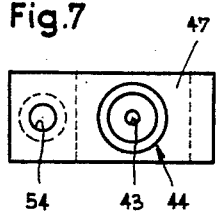
FIGURE 7 is a plan view of the device of FIG. 6.

Reference is now made to FIGURES 6 and 7. In the embodiment illustrated there the plug 44 is offset from the jaws and the axis of bore 43 in plug 44 extends transversely of the axis 45 of the opening 46 provided for the insertion of a screw to clamp the pipe in bore 43. Jaw 47 of the split collar has a bore 49 in axial alignment with a similar bore 52 in juxtaposed jaw 51. At the outer end bore 49 is flared into a truncated-cone recess 50 for receiving the head of a fastening member. On the side of opening 46 opposite plug 44, and in axial alignment with bore 43 extending therein, the bridge 51 of collar 48 is provided with the bore 52. A screw or nail inserted through bores 52 and 43 will, upon tightening, expand plug 44 and secure the device to the wall. Another screw or nail extending through bores 53 and 54 of jaws 55, 56 and into the wall will then serve to tighten collar 48 for gripping the pipe in opening 45.

Figure 8:
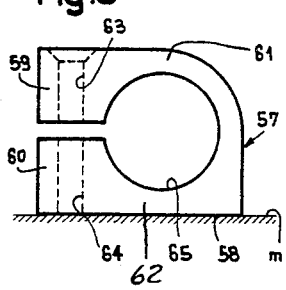
FIGURE 8 is a view similar to FIGS. 1 and 6 of still another embodiment.
Figure 9:
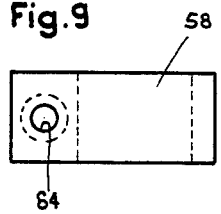
FIGURE 9 is a plan view of the device of FIG. 8.

Turning now to FIGURES 8 and 9. It will be seen that in this embodiment, a split collar 57, the plane face of which is intended to rest against the wall m or other panel as is the case with all of the embodiments illustrated, is fitted with two juxtaposed jaws or relatively massive flanges 59 and 60, forming respective extremities of the arms 61 and 62 of the collar. Jaws 59 and 60 are provided with axially aligned bores 63 and 64 for the passage of a screw or nail performing simultaneously the tightening of the collar against a pipe placed inside the opening 65 and the securing of the clamping device to the wall m.

Figure 12:
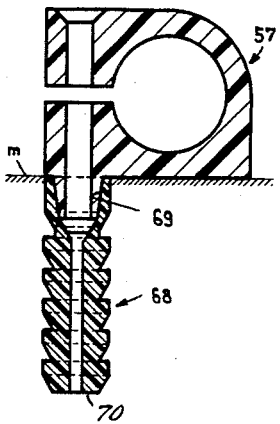
FIGURE 12 is a sectional view of another embodiment showing a combination of some of the features of FIGS. 10 and 11 with an expansible pin acting as tightening and fastening means.
Figure 2:
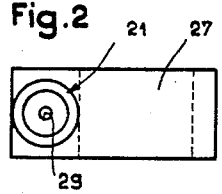
FIGURE 2 is a corresponding plan view of the pipe-mounting device of FIG. 1.
Figure 3:
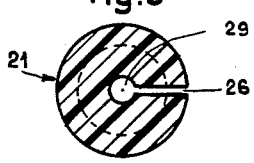
FIGURE 3 is a corresponding cross-sectional view along line III—III of FIG. 1 on a somewhat enlarged scale.
Figure 10:
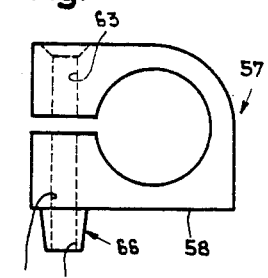
FIGURE 10 is a view similar to FIGS. 1, 6, 8 of yet a further embodiment.
Figure 11:
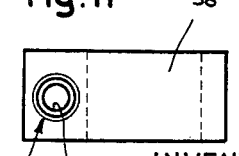
FIGURE 11 is a plain view of the device of FIG. 10.

In FIGURES 10, 11 and 12 the split collar 57, similar to the one shown in FIGURES 8 and 9, comprises a frustoconical stub 66 extending, preferably integrally, from the bearing surface 58 of the collar. Stub 66 has a bore 67 in axial alignment with bores 63 and 64 in the jaws of the collar. The stub is receivable for centering purposes in a complementary recess 69 of a separate plug 68 (FIG. 12) which has previously been inserted into the wall or panel m. Driving a screw or nail into the duct formed by the aligned bores 63, 64, and 67 and the bore 70 passing through the plug 68 serves to simultaneously tighten collar 57 about the tube and draw the collar with the tube tightly against the plug 68, thus anchoring the entire device in the wall or panel m.

I claim:
1. A mounting device for attaching a member having a closed periphery to a surface of a structure, comprising an integral clamping body having an abutment portion adapted to rest against a structure surface and a through-going opening of a configuration generally similar to that of said member for receiving the latter, said body being provided with a slot extending from the periphery of said body to said opening generally parallel to the bottom contacting surface of said body and spaced from said abutment portion, said slot subdividing said body into a pair of clamping portions laterally offset from said opening for clamping said member therewithin upon drawing of said clamping portions together; means for drawing said clamping portions together; and generally tubular fastening means integral with said body and projecting from said abutment portion transversely to said slot for extending into a hole formed in the structure surface, said body having at least one bore aligned with said fastening means and opening at the periphery of said body for passing an element into said fastening means to secure said body to said structure.

2. A pipe-mounting device for attaching a tubular member to a surface of a structure, comprising an integral clamping body of synthetic resin having a substantially planar abutment portion adapted to rest against a structure surface and a throughgoing generally circular opening for receiving said member, said body being provided with a diametral slot extending from the periphery of said body to said opening and generally parallel to said abutment portion and spaced therefrom, said slot sub-dividing said body into a pair of clamping portions laterally offset from said opening for clamping said member therewithin upon drawing of said clamping portions together; and generally tubular fastening means integral with said body and including an expandable plug projecting from said abutment portion transversely to said slot for extending into a hole formed in said surface, said body having at least one bore aligned with said fastening means and opening at the periphery of said body for passing an element into said plug for expanding the latter to secure said body to said structure.

3. A device as defined in claim 2 wherein said bore extends transversely to said slot and said bore and said plug are disposed along a line intersecting said slot whereby said element draws said clamping portions together concurrently with the securing of said body of said structure, said bore extending through both of said clamping portings.

4. A device as defined in claim 3 wherein said clamping portions are relatively massive in the region of said bores and are relatively thin in the region of said opening.

5. A device as defined in claim 4 wherein said plug is integral with said body.

6. A device as defined in claim 4 wherein said fastening means further includes a frusto-conical stub integral with said body and projecting therefrom, said plug having a recess receiving said frusto-conical stub.

7. A device as delned in claim 2 wherein said fastening means and said bore extend along a diameter of said opening, further comprising means offset from said fastening means for drawing said clamping portions together.

References Cited by the Examiner

UNITED STATES PATENTS

| 1,121,444 | 12/14 | Adler | 248—74 |
| 1,233,181 | 7/17 | Burns | 248—74 |
| 1,769,573 | 7/30 | Gwinn | 248—74 X |
| 2,961,210 | 11/60 | Pfaff et al. | 248—74 |

FOREIGN PATENTS

| 609,662 | 11/60 | Canada. |
| 320,872 | 5/20 | Germany. |
| 885,582 | 8/53 | Germany. |
| 294,635 | 5/29 | Great Britain. |
| 956,751 | 4/64 | Great Britain. |
| 990,925 | 6/51 | France. |
| 1,193,266 | 4/59 | France. |

CLAUDE A. LE ROY, *Primary Examiner.*

FRANK L. ABBOTT, *Examiner.*